UNITED STATES PATENT OFFICE.

GEORGE T. SMITH, OF MINNEAPOLIS, MINNESOTA.

IMPROVEMENT IN PROCESSES OF MANUFACTURING MIDDLINGS-FLOUR.

Specification forming part of Letters Patent No. 137,495, dated April 1, 1873; application filed October 12, 1872.

*To all whom it may concern:*

Be it known that I, GEORGE T. SMITH, of Minneapolis, county of Hennepin and State of Minnesota, have invented a new and useful Improvement in the Process of Manufacturing Flour, of which the following is a full, clear, and exact description.

It is well known to all who are familiar with grinding wheat, that, owing to the difference in the material of which the different portions of the wheat-berry is composed, and to the difference in the texture and condition of the various kernels which are being ground, the meal, when delivered from the stone, comprises a number of grades, both of flour and of bran. The white or flour-producing part of the berry, which lies next to the skin or bran, contains a far greater proportion of gluten, and is, consequently, firmer and tougher than the central portion, which, in turn, consists largely of starch. The result of this arrangement of the constituent elements of wheat is, that the operation of grinding and bolting, as heretofore carried on, produces four grades of material; and in order that the nature and scope of my invention may be clearly understood, I will briefly describe the process of milling as heretofore conducted, which is as follows:

The meal, after leaving the stones, is conveyed to a reel-bolt or series of bolts. Sometimes it is passed through an intermediate cooler or hopper bag; but as this cooling process may be used or not at the pleasure of the operator, and has no reference to the invention hereafter described, it need not be described. The material which passes through the head of the reel (clothed with, say, a No. 10 cloth) forms, without further manipulation, a merchantable grade of flour, and is sent directly to the packer, or is otherwise put up for market.

The next product of the reel-bolt is "returns," which are frequently fine enough for a high grade of flour, in fact, they sometimes pass through a No. 10 cloth, as did the merchantable flour; but they contain so large a percentage of fine bran and other specks, that if put directly into the flour they would discolor it to such an extent as to seriously impair its value. What then is done with these flour returns? They are already fine enough, therefore regrinding would only injure them. They are taken back to the freshly-ground wheat-meal, thoroughly mixed therewith, and then rebolted through the same set of reels. By this means the specks are taken out, and the flour returns become intimately incorporated with the flour, and the yield correspondingly increased.

It will be observed that these flour returns are not reground, purified, or otherwise treated, but are conveyed directly to the wheat-meal from which the flour is bolted, and are subjected to precisely the same operation, and under the same circumstances as this meal. I am thus explicit in describing the manner in which flour returns are handled in the present method of milling, because my manipulation of "middlings-returns" is essentially different.

The next product from the reel-bolt is middlings—that is, a mixture of fine bran, specks of cockle, and other foreign substances—a fuzzy, fibrous material, which has been separated from the skin of the berry, and coarse grains of that part of the kernel which lies next to the skin, and which contains so much gluten that although they must necessarily have been acted upon longer than the starchy center of the berry has been, yet remain larger and retain their angular form. These middlings were formerly purified in a machine having a draft of air, and then reground and bolted, after which a part of them are usually mixed with the flour taken from the head of the reel, the balance being sold separately as a low grade. The reason why a portion of the middlings thus treated yield a low grade of flour is this: it was customary to grind them but once, and to make them all fine in order to perfectly detach the bran. This materially injured the grain, and made it difficult if not impossible to separate the fine bran and specks by the use of a reel-bolt, in which they have been heretofore treated.

The object of my invention is to produce a flour from middlings, in which the granules shall be larger and more uniform in size than the flour which is made from the central part of the berry containing the starch in large proportions, and which shall be free from the fine dust-like particles produced by the first grinding of the wheat. To this end the invention consists in a novel mode, system, or order of purifying, grinding, and bolting the middlings, and of returning automatically the "middlings-returns" to be repurified, reground, and rebolted, as will be hereinafter fully explained.

In carrying out my invention I prefer to use certain machines which I have invented, and for which Letters Patent were granted me December 10, 1872, and upon which I have certain application now pending, as I believe them to produce better results, and to be more economical in their operation than any others now in use; yet, as my invention, method, or process is adapted to be used in mills where the middlings are cleaned upon any of the well-known machines which use an upward draft of air through the shaker, I will describe the succession or sequence of operations which I employ without making reference to any special machinery upon which these manipulations shall be effected.

Under ordinary circumstances I grind the wheat upon stones dressed in the usual manner, with, preferably, about thirty-two "cracks" to the inch, grinding very "high," and making—say, thirty to forty-five per cent. of middlings. The meal thus produce is bolted through an ordinary reel-bolt, and the merchantable flour conveyed to a flour room or packer, and corresponds to the first grade of flour commonly produced in merchant-mills. The middlings are transferred to a purifier having an upward draft of air, where the detached particles of bran and other similar impurities are removed, such size or number of machines being used as shall effect a thorough separation. These are next carefully reground, and in order to insure satisfactory results it is desirable that great care should be taken in dressing this middlings-stone to give it as true a face as may be, and that the cracks be clean, regular, and sharp. It is not intended that the first grinding should reduce all of the granules to the desired standard of size, as the difference in their hardness or toughness, which has been above explained, renders this impracticable. From this stone the middlings, meal, or chop is taken to a bolt, (preferably a reel,) which I call a middlings-bolt, clothed with such cloth as the required grade of flour shall indicate—say a No. 10. If this middlings-bolt were of sufficient capacity to insure that all of the flour which had been ground fine enough should pass through its meshes, it would permit so many specks to pass through as to seriously discolor the flour; hence, I use a bolt of such size that it shall be constantly overloaded, compelling a large portion of the material (usually about one-third of the amount which is fed in) to pass over the tail of the bolt. These middlings-returns, as I designate them, are not all fine enough for flour, owing to difficulty in grinding them all down to a uniform size by the first grinding, as has been explained, but a comparatively small portion of fine flour will serve to carry the specks over the tail of the reel. By means of a suitable conveyer I carry these middlings returns to a purifier, and subject them to a draft of air as they move over the surface of a shaker, the head of which is clothed with a fine cloth—say, a No. 10—which allows the finer portions to fall through, but takes out all of the specks and fine bran. A conveyer takes the flour thus purified and mixes it with that from the reel-bolt; or when it is desired to mix them more intimately, the flour taken from this returns-purifier may be incorporated with the middlings meal before the latter is delivered to the reel. The tail end of the middlings-returns purifier is clothed with a coarser cloth, so as to let the larger granules of the returns fall through. Of course, this material is freed from loose bran and specks; it is therefore conveyed to the middlings-stone and reground with the middlings which came from the middlings-purifier first referred to.

It will be readily understood that none, or at least very few, of middlings-returns which are taken from the middlings reel or bolt are as coarse as the middlings which are treated upon first shaker. Hence it is not advisable to use as coarse cloth or as strong a draft with the shaker upon which they—the middlings-returns—are repurified, because a strong draft would draw away the finer portions and a coarse cloth at the tail end of the shaker would let bran through, which would be objectionable, as I usually send the coarser returns directly to the stone, as stated above. Therefore I prefer to put a No. 7 cloth on the tail of this returns-shaker and convey such material as runs over at this point, if there be any, to the middlings-purifier and compel it to go through a heavy draft again. The tail end of the shaker of this middlings-purifier should have a No. 4 cloth, thus insuring that nothing shall go over this point except offal.

From the above description it will be seen that a uniform system of returning, repurifying, and regrinding is maintained, by which all of the middlings are converted into a flour of great purity and of a nearly uniform granulation.

Under some circumstances it is desirable to dispense with the machine which I have referred to as being used to repurify the middlings-returns. In this case I convey them—the middlings-returns—to the first machine upon which the middlings are purified, and as the head of this shaker is clothed with a No. 10 cloth the flour will be purified and fall through this fine cloth, and can be then mixed with the middlings-chop, or carried direct to the packer, just the same as though it had been treated upon a separate machine.

It is apparent that through this system or process of automatically returning these middlings-returns to be repurified and reground, thus compelling them to pass through the same round of stones, bolts, and purifiers, I reduce them to an almost absolute uniformity of grain and a very high state of purity, with, at the same time, little or no waste, because I can so regulate the draft upon the different machines, where more than one is used, or upon the different sections of the same machine where but one is employed, that nothing but light refuse is drawn away, and, by having a coarse cloth at the tail of the last or final machine in the series, I insure that there shall be no wastage at that point.

It will, of course, be understood that I do not wish to be confined to the use of a reel for a middlings-bolt; but I prefer one of that class at that point on account of its increased capacity, having found that I can do good work with it.

It will sometimes be found that a portion of the middlings thrown upon the first purifier are fine enough for the desired grade of flour, and would be injured by regrinding. To provide for this I clothe the head of the first shaker with a fine cloth, through which this flour may pass, and arrange a conveyer to collect it (the flour) and deliver it in the packer, or, what is better, to mix it with the middlings meal or chop between the stone and the middlings-bolt. This last-described conveyer might be dispensed with, because it is not essential to the carrying out of the spirit of my invention, but is in the nature of detail of construction, in order to secure a more perfect result, and modifications might be made in the numbers of the cloths, as the kind and condition of the grain or the peculiar necessities of each mill might indicate.

Having thus described the nature and operation of my invention, what I claim is—

The herein-described process of manufacturing flour from middlings by subjecting them to successive grindings, boltings, and intermediate purifications by currents of air substantially as set forth.

In testimony whereof I have hereunto set my hand this 16th day of September, A. D. 1872.

GEORGE T. SMITH.

Witnesses:
EDM. F. BROWN,
WILSON AGER.